United States Patent [19]

McGinniss

[11] 4,166,017

[45] Aug. 28, 1979

[54] PROCESS FOR CATHODIC ELECTROCOATING AND PHOTOCURING

[75] Inventor: Vincent D. McGinniss, Valley City, Ohio

[73] Assignee: SCM Corporation, New York, N.Y.

[21] Appl. No.: 689,106

[22] Filed: May 24, 1976

[51] Int. Cl.$^2$ .................... C25D 13/06; C25D 13/10; C08F 8/00
[52] U.S. Cl. .......................... 204/181 C; 204/159.15; 204/159.16; 204/159.19; 204/181 E
[58] Field of Search ................ 204/181, 181 C, 181 E

[56] References Cited

U.S. PATENT DOCUMENTS

| 3,682,814 | 8/1972 | Gilchrist | 204/181 |
| 3,708,413 | 1/1973 | Kehr | 204/159.14 |
| 3,954,587 | 5/1976 | Kokawa | 204/181 |

OTHER PUBLICATIONS

Journal of Paint Technology, vol. 44, No. 571 (Aug. 1972), pp. 33–36.

Primary Examiner—Howard S. Williams
Attorney, Agent, or Firm—Merton H. Douthitt

[57] ABSTRACT

An electrocoating composition containing a polymer having pendant amine groups, an alpha-, beta-ethylenically unsaturated carbonyl cross-linking agent, and an ultraviolet photosensitizer can be electrodeposited onto a cathode substrate disposed within an aqueous electrocoating bath. The amine groups of the polymer are protonated to render the polymer water dispersible prior to electrodeposition and upon electrodeposition the amine groups become de-protonated. The cross-linking agent cross-links the polymer upon ultraviolet irradiation of the electrocoated cathode substrate to form a fully-cured electrodeposited coating on the cathode substrate.

7 Claims, No Drawings

PROCESS FOR CATHODIC ELECTROCOATING AND PHOTOCURING

CROSS-REFERENCES TO RELATED APPLICATIONS

This application is cross-referenced to the following commonly assigned applications of applicant: U.S.S.N. 560,108 filed on March 19, 1975; now U.S. Pat. No. 3,975,251 and U.S. Serial Nos. 689,104 and 689,105 both filed on even date herewith. The disclosures of the listed applications are expressly incorporated herein by reference.

BACKGROUND OF THE INVENTION

This invention relates to electrodeposition of water-dispersed polymers onto a cathode substrate and more particularly to cross-linking said electrodeposited polymers with alpha-, beta-ethylenically unsaturated carbonyl.

U.S. Pat. No. 3,975,251 of applicant, Vincent D. McGinniss, describes an electrocoating composition of a polymer having pendant amine groups and an alpha-, beta-ethylenically unsaturated carbonyl cross-linking agent. The electrocoating composition is electrodeposited onto a cathode substrate and heat cured.

The present invention is directed to an electrocoating process which utilized the ethylenically unsaturated cross-linking agent for curing a polymer which has been electrodeposited onto a cathode substrate and where the ethylenically unsaturated carbonyl cross-links the polymer upon ultraviolet irradiation of the electrocoated cathode substrate.

SUMMARY OF THE INVENTION

A process for electrodeposition of an electrocoating composition dispersed in an aqueous electrocoating bath onto a cathode substrate disposed within said bath to form a curable electrodeposited coating on said cathode substrate, which comprises:

cathodically electrodepositing said electrocoating composition onto said cathode substrate under cathodic electrocoating conditions, said electrocoating composition comprising (a) a water-dispersed electrocoating polymer having at least about 5% by weight pendant amine groups, each said amine group being attached to an alpha carbon relative to each said amine group, (b) at least about 5% by weight of said polymer of an alpha-, beta-ethylenically unsaturated carbonyl cross-linking agent having at least two alpha-, beta-ethylenically unsaturated carbonyl groups, (c) at least about 0.5% by weight of said polymer of an ultraviolet photosensitizer; and irradiating said curable coating on said cathode substrate with ultraviolet radiation to cross-link said cross-linking agent with said alpha carbon to cure said coating.

DETAILED DESCRIPTION OF THE INVENTION

The electrocoating composition contains an electrocoating polymer or resin selected according to final desired use from a wide variety of known polymers in the electrocoating art.

The polymers contain pendant amine groups. The amine groups can be primary, secondary, or tertiary for present purposes. By protonating such amine groups, the polymer can be water dispersed. Electrodeposition of the polymer de-protonates the amine groups. Amine groups can be attached to the polymer by reacting free carboxyl groups on a polymer (polyester, acrylic, urethane, etc.) containing available carboxyl groups with alkyleneimine or substituted alkyleneimine, as proposed in U.S. Pat. No. 3,679,564 and U.S. Pat. No. 3,617,458, and incorporated herein by reference. Similarly, amine groups can be introduced into the polymer by reacting pendant carboxylic acid groups on a polymer with ethylene imine or derivatives of ethylene imine. Difunctional amines also can be reacted with reactive pendant carboxyl groups on the polymer.

Blocked amines also can be attached to the polymer and, if desired, subsequently transformed into primary amine groups by an appropriate reaction which will be outlined in detail later herein. Such blocked amine groups can be attached to epoxy resins or acrylic resins having pendant oxirane groups by reacting a ketimine blocked diethylene triamine, formed from reacting diethylene triamine with an excess of methyl ethyl ketone, with the polymer. Other similar blocked dialkyltriamines also can be employed to attach the blocked amine groups.

The amine groups are pendantly attached to the polymer. For purposes of this application, pendant amine groups include terminal amine groups. By pendantly attached is meant that such amine groups are attached to the polymer chain or to a pendant side chain of the polymer. The polymer containing pendant amine groups should contain at least about 5% by weight of such pendant amine groups, and up to about 50% is desired.

Representative polymers containing pendant amine groups can be derived from epoxy and epoxy-modified diglycidyl ethers of bis-phenol A structures, various aliphatic polyethylene or polypropylene glycol (diglycidyl ether) adducts, and glycidyl ethers of phenolic resins, such epoxy resins being commercially available and commonly used in the electrocoating field. Other useful polymers containing pendant amine groups include polyamide resins, for example, condensation products of dimerized fatty acids coreacted with difunctional amine, such as ethylene diamine. Polyamide resins generally are between about 500 and about 5,000 molecular weight. Further useful electrocoating polymers containing pendant amine groups include acrylic resins having molecular weight of about 1,000 to about 100,000, polyester resins and polyurethane resins both having a molecular weight range of about 500 to about 5,000, vinyl resins, and amine resins. Various other useful electrocoating polymers containing pendant amine groups can be advantageously employed in the composition of this application as will be apparent to those skilled in the art.

The cross-linking agent is an alpha-, beta-ethylenically unsaturated carbonyl having alpha-, beta-ethylenic unsaturation capable of being reactive to cross-link the polymer. The unsaturated cross-linking agent has at least two pendantly attached alpha-, beta-ethylenically unsaturated carbonyl groups of the following general structure:

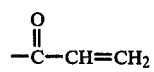

Each unsaturated carbonyl group is pendantly attached to a radical selected from the group consisting of an alkyl, an aryl, an alkyl-aryl, and polymers having a molecular weight up to about 3,000. Pendantly attached unsaturated carbonyl groups are attached to the radical chain or to a said chain of the radical.

Preferably, the unsaturated carbonyl groups are attached to an oxygen molecule and are represented by the following general structure:

A preferred unsaturated cross-linking agent then is a multi-acrylate having at least two pendant acrylate groups. Specific preferred cross-linking agents which are particularly suited to the precepts of this invention can be selected from the group consisting of: ethylene glycol diacrylate, ethylene glycol dimethacrylate, 1,3-butylene glycol dimethacrylate, bisphenol A dimethacrylate, diethylene glycol diacrylate, pentaerthritol triacrylate, pentaerythritol teraacrylate, trimethylolpropane triacrylate, triethylene glycol dimethacrylate, tetraethylene glycol dimethacrylate, tetraethylene glycol diacrylate, 1,6-hexanedioldiacrylate, melamine acrylate, ethoxylated bisphenol A dimethacrylate, pentaerythritol tetramethacrylate, and polyethylene glycol dimethacrylate.

The preferred unsaturated cross-linking agents can be synthesized by various methods, such as reacting hydroxyl-containing compounds with acrylyl chlorides or methacrylyl chlorides, direct esterification of hydroxyl-containing compounds with ethylmethacrylate, methylmethacrylate and the like. The preferred unsaturated cross-linking agents also can be produced by the trans-esterification of esters or polyesters with 2-hydroxyethylacrylate, 2-hydroxyethylmethacrylate, hydroxypropylmethacrylate and the like. The preferred unsaturated cross-linking agents can be produced additionally by reacting diisocyanates, polyisocyanates, or isocyanate-terminated polymers and prepolymers with hydroxyl-containing acrylic and methacrylic esters such as, for example, 2-hydroxyethylacrylate or hydroxypropylmethacrylate; by reacting epoxy polymers with acrylic acids or methacrylic acids; and by reacting carboxyl-containing compounds with glycidyl acrylates or glycidyl methacrylates. Further useful unsaturated cross-linking agents include acrylamides, vinyl ketones, and the like.

The unsaturated cross-linking agent cross-links the polymer upon irradiation of the electrocoated cathode substrate with ultraviolet radiation in the presence of a photosensitizer. The reaction mechanism is a free radical addition polymerization involving the linking of the unsaturation of the cross-linking agent with the alpha carbons of the pendant amine groups of the polymer. By alpha carbon of the pendant amine groups is meant the carbon in the alpha position relative to the amine group and to which the pendant amine group is attached.

The UV sensitizers are combined with the electrocoating composition and are adapted to be simultaneously co-deposited with the composition onto the cathode substrate during the electrodeposition process. The UV sensitizers are added to the electrocoating composition in amounts of at least about 0.5% and preferably between about 1% and 5% by weight of the polymer.

Useful UV sensitizers or photosensitizers include halogenated polynuclear ketones as disclosed in co-pending Ser. No. 480,738 and U.S. Pat. No. 3,827,957, the same incorporated expressly herein by reference. Other suitable UV sensitizers include organic carbonyl compounds selected from alkylphenones, benzophenones, and tricyclic fused ring compounds as disclosed in U.S. Pat. No. 3,759,807 and incorporated expressly herein by reference. Further useful UV sensitizers include carbonylated phenyl nuclear sulfonyl chlorides such as set forth in U.S. Pat. No. 3,827,959, and expressly incorporated herein by reference. Additional useful photosensitizer combinations particularly suitable for pigmented coatings are a combination of sensitizers comprising aromatic carbonyl compounds, aromatic aldehydes or aromatic ketones, and a synergistic sensitizer of about 0.05% to 3% of 2,2'-dithiobis-(benzothiazole) as more particularly set forth in U.S. Pat. No. 3,847,771 and expressly incorporated herein by reference. At least about 0.5% by weight of ultraviolet sensitizer and preferably about 1% to 5% sensitizer is added to the polymer and thoroughly mixed or otherwise dispersed in the polymer phase prior to solubilizing the polymer in an aqueous solution.

In practicing this invention, the polymer is rendered water dispersible by adding sufficient acid to the polymer to completely neutralize the polymer. Appropriate acids are, for example, proton-donating acids such as phosphoric, sulfuric, hydrochloric, acetic, formic, lactic, and other proton-donating organic and inorganic acids. Water solubility is achieved by the protonating of all amine groups of the polymer by the acid. The protonating of the amine groups of the polymer also renders the polymer positively charged so that during electrodeposition the polymer can migrate to the cathode substrate and be deposited thereon.

The neutralized polymer and UV sensitizer are blended with at least about 5% of the cross-linking agent by weight of the polymer and up to about 25% if desired. The blend then is dispersed in water to form the electrocoating bath of from about 5 to 20% non-volatile dispersion. The bath is generally about 50° to about 125° F., with about 70° to about 95° F. being preferred.

The neutralized (protonated) polymer and cross-linking agent are both stable in the bath. The cathode substrate to be electrocoated then is immersed in the electrocoating bath while an electric potential is maintained therethrough as disclosed in U.S. Pat. No. 3,169,398, the same being incorporated herein by reference. During electrodeposition the positively charged polymer along with cross-linking agent and the UV sensitizer migrate to the cathode substrate. The protonated amine groups of the polymer become de-protonated (lose protons) due to the electric potential applied. The polymer, the cross-linker, and the UV sensitizer are co-deposited on the cathode substrate. The electric potential applied to the bath is generally between about 20 and about 500 volts, with about 50 to about 300 volts being preferred. The coated substrate is removed from the bath and can be washed with water to remove excess coating. The electrodeposited coating on the cathode substrate is cured with ultraviolet radiation in the presence of the ultraviolet (UV) sensitizer or photosensitizer.

Typical sources of ultraviolet energy ordinarily produce wavelengths in the ultraviolet spectrum that are transmitted through a quartz and such wavelengths are usually between about 1,000 Å and 4,000 Å. Suitable ultraviolet emittors include various electric arc lamps, plasma arc torch, such as described in U.S. Pat. No. 3,364,487, and laser having a lasing output in the ultraviolet spectrum as disclosed in copending U.S. Serial No. 189,254, the disclosures of said references are incorporated expressly herein by reference. Other suitable sources of actinic light include quartz mercury lamps, ultraviolet quartz lamps, and high flash lamps. Details of ultraviolet radiation curing the instant electrocoating composition can be as practiced in copending U.S. Ser. No. 480,738, the disclosure of which is incorporated expressly herein by reference.

The cathode substrate is an electrically conductive metal such as iron, steel, aluminum, copper, galvanized steel, zinc, and the like. The cathode substrate can be in the shape of bars, sheets, irregularly shaped forms with rounded or sharp edges, and like shapes. The electrocoating composition can contain opacifying pigments and inert extenders such as, for example, titanium dioxide, zinc oxide, clays such as kaolinite clays, silica, talc, and the like.

The following examples show how the instant invention can be practiced, but should not be construed as limiting the invention. In the specification all parts are parts by weight, all percentages are weight percentages, and all temperatures are in degrees Fahrenheit, unless otherwise expressly indicated.

EXAMPLE 1

A solution acrylic polymer was conventionally prepared by reacting methyl methacrylate (290 parts per weight, ppw), ethyl acrylate (230 ppw), butyl methacrylate (320 ppw), 2-hydroxyethylacrylate (20 ppw), and diethylamineethylmethacrylate (140 ppw) in 2-butoxy ethanol-1 solvent (500 ppw) for six hours in the presence of benzoyl peroxide and VAZO 64 catalysts.

The resulting acrylic polymer having pendant amine groups was blended with 5% of 2-chlorothioxanthone photosensitizer and 20% of pentaerythritoltriacrylate cross-linking agent. The blend was neutralized with acetic acid and dispersed in deionized water to form a 10% non-volatile electrocoating bath.

The resulting electrocoating composition was cathodically electrodeposited onto a steel panel at 100 volts for 30 to 60 seconds, removed from the bath, and washed with water. The electrocoated panel then was covered with a thin polyethylene sheet, placed under an 800 watt medium pressure mercury lamp (ultraviolet radiation source), and irradiated for 30 minutes. A hard, flexible, solvent-resistant coating covered the panel.

EXAMPLE 2

One mole of an epoxy resin (DER 664, epoxy equivalent weight of 900, Dow Epoxy Resin, Dow Chemical Company) was reacted at 60° C. with two moles of ketimine blocked diethylene triamine represented by the following structure:

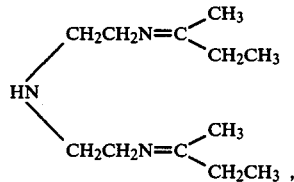

completely neutralized with 4 moles of lactic acid, and blended with 20% melamine acrylate (acrylate functionality of 2.7) cross-linking agent with 10% benzophenone photosensitizer. The blend was added to 2-butoxy ethanol-1 and deionized water to form a 7% nonvolatile (solids) dispersion.

This electrocoating composition was cathodically electrodeposited at 100 volts for one minute onto a steel panel, removed from the bath, and washed with water.

The coating then was heated at 200° F., for 10 minutes to flow-out the coating. Some cure of the coating resulted due to the pendant amine groups of the polymer linking with the cross-linking agent.

Full cure of the coating was obtained by placing a thin film of polyethylene over the coated panel and irradiating the coated panel for 10 minutes under an 800 watt medium pressure mercury lamp.

EXAMPLE 3

The cathodic electrocoating compositions of Examples 1 and 2 each were prepared again, except that the ultraviolet photosensitizer system used for each was 1% Michler's Ketone, 5% benzophenone, and 3% 2,2'-dithiobis (benzothiazole).

Each composition was cathodically electrocoated and cured by exposure to ultraviolet irradiation in the same manner as described in Examples 1 and 2 above. A fully cured, hard, flexible, solvent-resistant coating resulted upon curing.

I claim:

1. A process for the electrodeposition of an electrocoating composition onto a cathode substrate to form a curable coating on said cathode substrate, which comprises:

cathodically electrodepositing said electrocoating composition onto said cathode substrate under cathodic electrocoating conditions, said electrocoating composition comprising: (a) a water-dispersed electrocoating polymer having at least about 5% by weight pendant amine groups, each said amine group being attached to an alpha carbon relative to each said amine group, (b) at least about 5% by weight of said polymer of an alpha-, beta-ethylenically unsaturated carbonyl cross-linking agent having at least two alpha-, beta-ethylenically unsaturated carbonyl groups, and (c) at least about 0.5% by weight of said polymer of an ultraviolet photosensitizer; and irradiating said curable coating on said cathode substrate with ultraviolet radiation to cross-link said alpha carbon of said amine groups of said polymer with said cross-linking agent to cure said coating.

2. The electrodeposition process of claim 1 wherein each said alpha-, beta-ethylenically unsaturated carbonyl group of said cross-linking agent is represented by the following general structure:

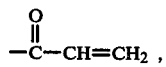

and each said group is pendantly attached to a radical selected from the group consisting of an alkyl, an aryl, an alkyl-aryl, and polymers having a molecular weight up to about 3,000.

3. The electrocoating process of claim 1 wherein said electrocoating polymer is rendered water-dispersible by protonating said amine groups with proton-donating acid and said protonated amine groups become deprotonated by electrodeposition of said polymer having protonated amine groups onto said cathode substrate.

4. An uncured electrocoated cathode substrate having an ultraviolet radiation curable coating thereon of the electrocoating composition of claim 1.

5. A cathode substrate prepared by the process of claim 1.

6. A process for the electrodeposition of an electrocoating composition dispersed in an aqueous electrocoating bath onto a cathode substrate disposed within said bath to form a curable electrodeposited coating on said cathode substrate, which comprises:

cathodically electrodepositing said electrocoating composition onto said cathode substrate under cathodic electrocoating conditions, said electrocoating composition comprising: (a) a water-dispersed electrocoating polymer having at least about 5% by weight pendant amine groups, each said amine group being attached to an alpha carbon relative to each said amine group, (b) at least about 5% by weight of said polymer of an acrylate cross-linking agent having at least two pendant acrylate groups, and (c) at least about 0.5% by weight of said polymer of an ultraviolet photosensitizer; and irradiating said curable coating on said cathode substrate with ultraviolet radiation to cross-link said alpha carbon of said amine groups of said polymer with said cross-linking agent to cure said coating.

7. A process for the electrodeposition of an electrocoating composition dispersed in an aqueous electrocoating bath onto a cathode substrate disposed within said bath to form a curable electrodeposited coating on said cathode substrate, which comprises:

cathodically electrodepositing said electrocoating composition onto said cathode substrate under cathodic electrocoating conditions, said electrocoating composition comprising: (a) a water-dispersed electrocoating polymer having at least about 5% by weight pendant amine groups, each said amine group being attached to an alpha carbon relative to each said amine group, (b) at least about 5% by weight of said polymer of an acrylamide cross-linking agent having at least two pendant acrylamide groups, and (c) at least about 0.5% by weight of said polymer of an ultraviolet photosensitizer; and irradiating said curable coating on said cathode substrate with ultraviolet radiation to cross-link said alpha carbon of said amine groups of said polymer with said cross-linking agent to cure said coating.

* * * * *

UNITED STATES PATENT AND TRADEMARK OFFICE
CERTIFICATE OF CORRECTION

PATENT NO. : 4,166,017
DATED : August 28, 1979
INVENTOR(S) : VINCENT D. MCGINNISS It is certified that error appears in the above-identified patent and that said Letters Patent are hereby corrected as shown below:

Column 3, line 21, change "teraacrylate" to --tetraacrylate--; column 5, line 2, change "189,254" to --189,254 (now abandoned)--.

Signed and Sealed this

Twentieth Day of November 1979

[SEAL]

Attest:

RUTH C. MASON
Attesting Officer

LUTRELLE F. PARKER
Acting Commissioner of Patents and Trademarks